(12) United States Patent
Roesch

(10) Patent No.: US 11,410,404 B2
(45) Date of Patent: Aug. 9, 2022

(54) DATA EXTRACTION FOR MACHINE-LEARNING OBJECT RECOGNITION FROM A DIGITAL MODEL AND TESTING-DATA CONSTRUCTION

(71) Applicant: Karl A. Roesch, Seattle, WA (US)

(72) Inventor: Karl A. Roesch, Seattle, WA (US)

( * ) Notice: Subject to any disclaimer, the term of this patent is extended or adjusted under 35 U.S.C. 154(b) by 0 days.

(21) Appl. No.: 17/210,321

(22) Filed: Mar. 23, 2021

(65) Prior Publication Data

US 2021/0390790 A1 Dec. 16, 2021

Related U.S. Application Data

(60) Provisional application No. 62/993,268, filed on Mar. 23, 2020.

(51) Int. Cl.
*G06T 19/20* (2011.01)
*G06T 7/62* (2017.01)

(52) U.S. Cl.
CPC ............... *G06T 19/20* (2013.01); *G06T 7/62* (2017.01); *G06T 2210/21* (2013.01); *G06T 2219/2016* (2013.01)

(58) Field of Classification Search
CPC ....... G06T 19/20; G06T 7/62; G06T 2210/21; G06T 2219/2016
See application file for complete search history.

(56) References Cited

U.S. PATENT DOCUMENTS

| 9,026,407 B1 * | 5/2015 | Kennefick | G06F 30/20 |
| | | | 703/1 |
| 2021/0150821 A1 * | 5/2021 | Cramer | G06K 19/06037 |

* cited by examiner

*Primary Examiner* — Chong Wu
(74) *Attorney, Agent, or Firm* — P G Scott Born; Foster Garvey PC

(57) ABSTRACT

A computer-implantable method includes accessing a model file containing a digital 3-D object, calculating at least one dimensional measurement of the object, uniformly scaling the object in the X, Y and Z axes by a predetermined percentage, mirroring the object across the X, Y and Z axes, slicing the mirrored object at a predetermined interval by an infinite plane in both a rotated and animated state of the infinite plane, generating from the slices points at the edge of a plane object collision, and assigning to the points positive and negative values relating to all possible X, Y and Z quadrant locations.

12 Claims, 3 Drawing Sheets

DATA EXTRACTION FOR MACHINE-LEARNING OBJECT RECOGNITION FROM A DIGITAL MODEL AND TESTING-DATA CONSTRUCTION

PRIORITY CLAIM

This application claims priority from U.S. Prov. Appl. No. 62/993,268 filed Mar. 23, 2020, the entirety of which is hereby incorporated by reference as if fully set forth herein.

BACKGROUND

Previously, in the field of object recognition/identification, only two-dimensional approaches have been successful where, for example, machine learning is used to identify features and patterns on popular social media websites. Current methods fail to identify the third dimension of an object for purposes of identifying the object.

BRIEF DESCRIPTION OF THE DRAWINGS

Preferred and alternative embodiments of the present invention are described in detail below with reference to the following drawings.

DETAILED DESCRIPTION

Figure 1:
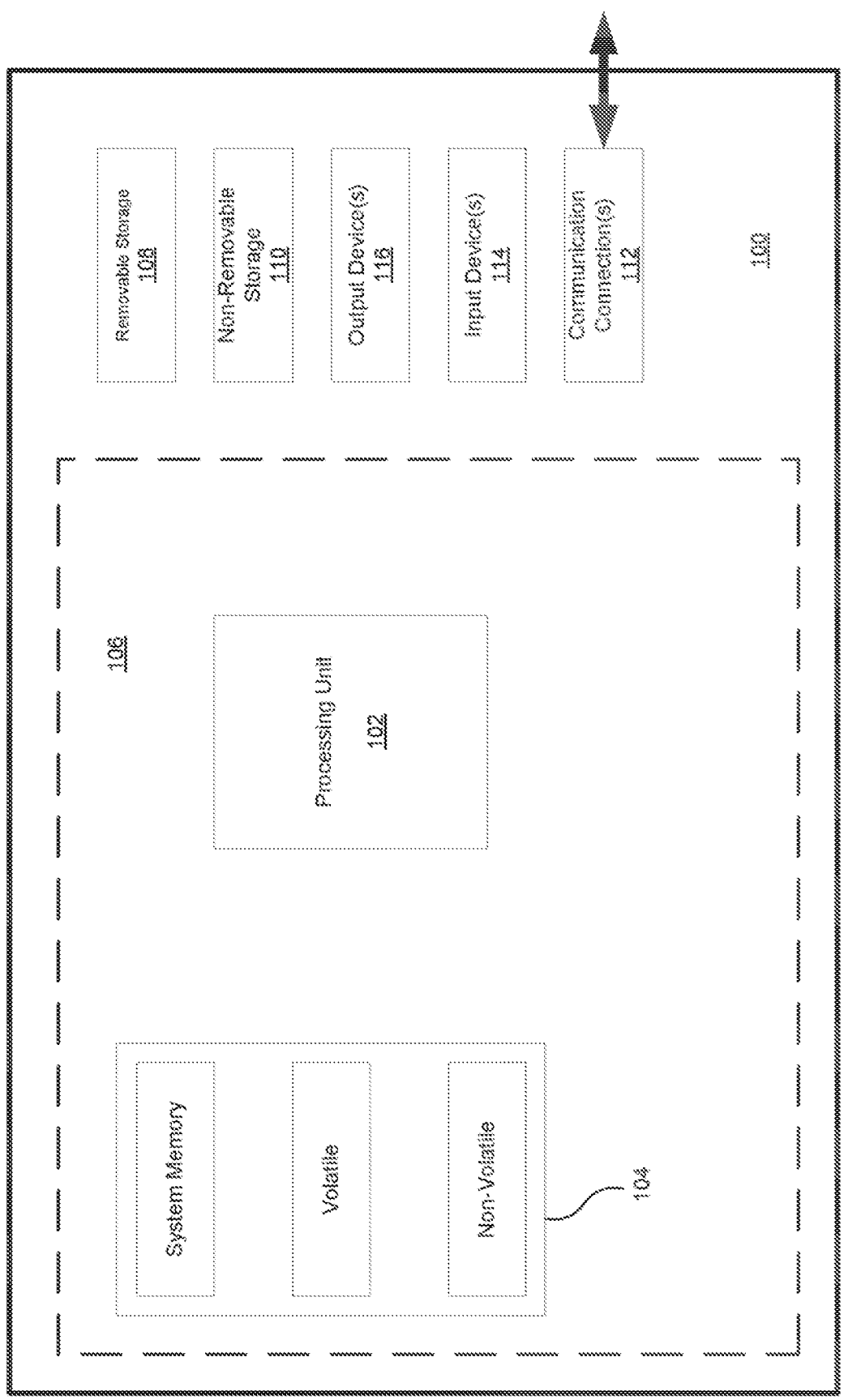
FIG. 1 is a schematic view of an exemplary operating environment in which an embodiment of the invention can be implemented.

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

Embodiments of the invention may be described in the general context of computer-executable instructions, such as program modules, being executed by a processing device having specialized functionality and/or by computer-readable media on which such instructions or modules can be stored. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Embodiments of the invention may include or be implemented in a variety of computer readable media. Computer readable media can be any available media that can be accessed by a computer and includes both volatile and nonvolatile media, removable and non-removable media. By way of example, and not limitation, computer readable media may comprise computer storage media and communication media. Computer storage media include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by a computer. Communication media typically embodies computer readable instructions, data structures, program modules or other data in a modulated data signal such as a carrier wave or other transport mechanism and includes an information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices and can be used to implement or otherwise perform practical applications.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

With reference to FIG. 1, an exemplary system for implementing an embodiment of the invention includes a computing device, such as computing device 100. The computing device 100 typically includes at least one processing unit 102 and memory 104.

Depending on the exact configuration and type of computing device, memory 104 may be volatile (such as random-access memory (RAM)), nonvolatile (such as read-only memory (ROM), flash memory, etc.) or some combination of the two. This most basic configuration is illustrated in FIG. 1 by dashed line 100.

Additionally, the device 100 may have additional features, aspects, and functionality. For example, the device 100 may include additional storage (removable and/or non-removable) which may take the form of, but is not limited to, magnetic or optical disks or tapes. Such additional storage is illustrated in FIG. 1 by removable storage 108 and non-removable storage 110. Computer storage media includes volatile and nonvolatile, removable and non-removable media implemented in any method or technology for storage of information such as computer-readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

The device 100 may also include a communications connection 112 that allows the device to communicate with other devices. The communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, the communication media includes wired media such as a wired network or direct-wired connection, and wireless media such as acoustic, radio-frequency (RF), infrared and other wireless media. The term computer-readable media as used herein includes both storage media and communication media.

The device 100 may also have an input device 114 such as keyboard, mouse, pen, voice-input device, touch-input device, etc. Further, an output device 116 such as a display, speakers, printer, etc. may also be included. Additional input devices 114 and output devices 116 may be included depending on a desired functionality of the device 100.

Figure 2:
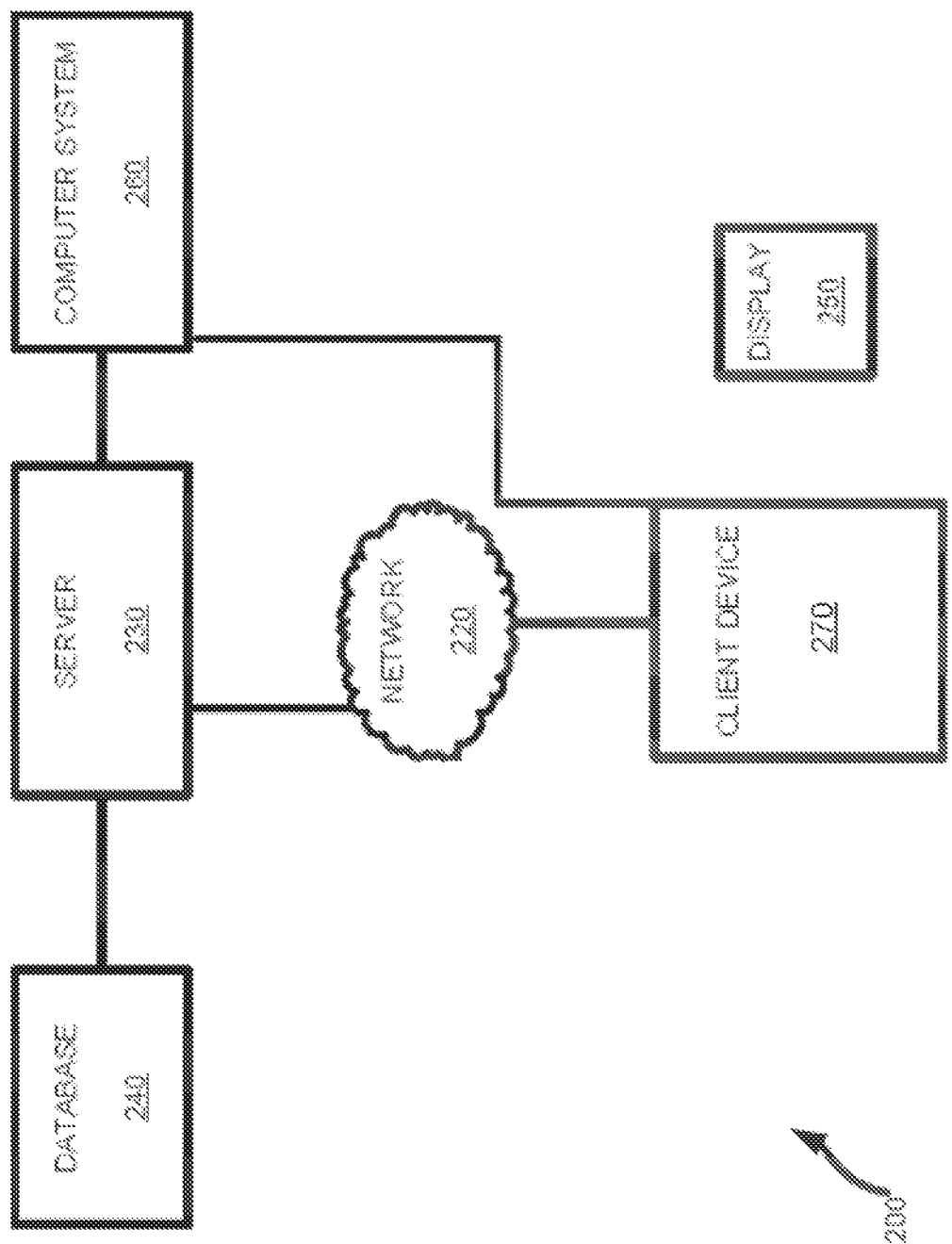
FIG. 2 is a functional block diagram of an exemplary operating environment in which an embodiment of the invention can be implemented.

Referring now to FIG. 2, an embodiment of the present invention may take the form, and/or may be implemented using one or more elements, of an exemplary computer network system 200. The system 200 includes an electronic client device 270, such as a personal computer or workstation, tablet or smart phone, that is linked via a communication medium, such as a network 220 (e.g., the Internet), to an electronic device or system, such as a server 230. The server 230 may further be coupled, or otherwise have access, to a database 240 and a computer system 260. Although the embodiment illustrated in FIG. 2 includes one server 230 coupled to one client device 270 via the network 220, it should be recognized that embodiments of the invention may be implemented using one or more such client devices coupled to one or more such servers.

The client device 270 and the server 230 may include all or fewer than all of the features associated with the device 100 illustrated in and discussed with reference to FIG. 1. The client device 270 includes or is otherwise coupled to a computer screen or display 250. The client device 270 may be used for various purposes such as network- and local-computing processes.

The client device 270 is linked via the network 220 to server 230 so that computer programs, such as, for example, a browser, running on the client device 270 can cooperate in two-way communication with server 230. The server 230 may be coupled to database 240 to retrieve information therefrom and to store information thereto. Database 240 may have stored therein data (not shown) that can be used by the server 230 and/or client device 270 to enable performance of various aspects of embodiments of the invention. The data stored in database 240 may include, for example, one or more digital 3-D model files. Additionally, the server 230 may be coupled to the computer system 260 in a manner allowing the server to delegate certain processing functions to the computer system. In an embodiment, most or all of the functionality described herein may be implemented in a desktop application that may include one or more executable modules. In an embodiment, the client device 270 may bypass network 220 and communicate directly with computer system 260.

One or more embodiments may include a method and product. An embodiment may include a method in the sense that the executed code provides a series of operations that create a data output for building a machine-learning database for three-dimensional (3-D) object recognition. The resulting product is unique because with the built database that is established by performance of at least one method described herein, any three-dimensional object becomes recognizable in any orientation in digital space.

One or more embodiments of the invention may provide the following types of influence:

Lower manufacturing costs, reduced shipping waste, ending international slave labor, reduction in waste in manufacturing/clean manufacturing, safer contactless transactions, eliminate theft on a large scale, provide third-world countries access to products they normally wouldn't have, and fast response in natural disasters; people willing and able to help have more means.

Design/engineering—access to equipment will be drastically different—accelerate innovation by magnitude. Can drive new indirect material sciences revolution. Robotics operating in real world and learning. Robotics that can interact in dynamic environments—and learn new objects.

Medical field—taking three-dimensional scanned body parts and organs from MRI's and other imaging equipment, an embodiment can identify commonalities and potential risks once the learning database is established.

Rio-technology—using three-dimensional scanned body parts, building a database of manufactured parts—(e.g., hip replacement elements) a more personalized product can be produced at cheaper costs based off of the database.

Consumer goods—as large companies (for example Adidas® 4d shoes) start to want to deliver products straight to consumers, the risk of the model leaking to the internet is a security concern. An embodiment can be used as digital rights media protection.

Military and Public safety—as firearms are now capable of being three dimensionally printed an embodiment can identify potential threats as well as new threats and serve as a warning system. Laser scanner/3-D camera hooked to drone creates real time combat threat detection with ability to analyze data in real time—weapon/firearm/threat analysis. Three-dimensional object cryptography with recognition. Facial recognition of everyone on planet.

Patenting and invention—pan embodiment is capable of determining within a given percentage of similarity/closeness (e.g. 5% or less) whether or not multiple compared objects are replicated from each other.

Internet—once in circulation for some time and an extensive library for comparing is built, the data can be used to build a comprehensive search engine for three-dimensional digital objects that is derived from an embodiment, not a user stating tags.

Aeronautics and space travel—No need to transport large objects, just data files and a 3-D printer.

In the medical realm, an embodiment of the database can be built and used to upload and check against as early detection for cancers, aneurysms, blood clots, diseases, and organ failure.

In biotech, it may directly tie into an upload and check against disease. As three-dimensional printing evolves, the ability to print organs and body pans will as well. As body parts could become designed, specific features could be detected via an embodiment.

As a search engine and repository for three-dimensional objects uploaded to the internet that are identified through machine learning.

As a resource for companies that wish to provide direct to market three-dimensional prints but lack the protections if a model was stolen that could be printed from home, digital rights media for three-dimensional objects.

According to one or more embodiments, someone at their house with a 3-D printer can produce for someone else at the push of a button and mail it to that person. Additionally, an entity with large amounts of additive manufacturing machines can produce industrial products for another company.

An embodiment can extract data from digital three-dimensional models that could then be used to build a database for object-based machine learning, which in turn is used for machines to recognize and differentiate objects.

Figure 3:
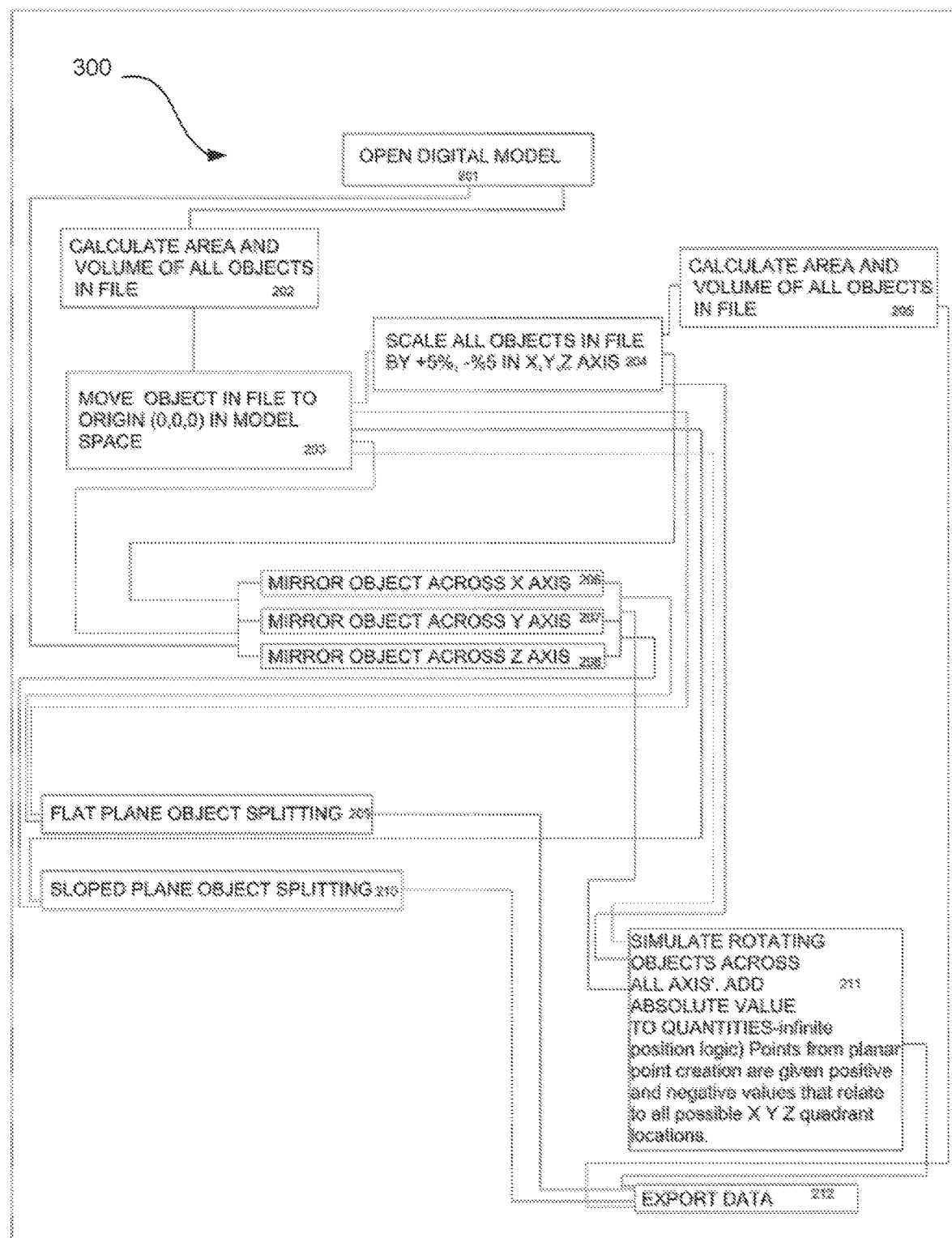
FIG. 3 illustrates steps running in code to extract the most comparative and discernable data according to an embodiment of the invention.

FIG. 3 illustrates a process 300, according to an embodiment of the invention. The process 300 is illustrated as a set of operations shown as discrete blocks and may be performed, for example, by a processing device such as client device 270. One or more steps of the process 300 may be implemented in any suitable hardware, software, including instructions embodied within components, firmware, or combination thereof. The order in which the operations associated with the process 300 are described is not to be necessarily construed as a limitation.

In an embodiment, the composition of the code is extensible markup language, but can run in several languages in varying embodiments. The diagram in FIG. 3 outlines the steps running in the code according to an embodiment to extract the most comparative and discernable data. The operation may be set up to be launched and run as a standalone executable.

An optionally advantageous feature of the code according to an embodiment is "simulate rotating objects across all axis, perform absolute value" illustrated in step 211. This allows for the raw data export to calculate derivatives across all three-dimensional axes.

At a step 201, the code is executed and is directed to a digital 3-D model. For example, client device 270 may access a model file containing a digital 3-D object (e.g., body part, shoe, firearm, etc.) from server 230 over network 220.

At a step 202, basic math functions such as calculation of area and volume of the object in the model file may be performed.

At a step 203, the object may be moved to origin (0,0,0) in digital space.

At a step 204, the geometry of the object may be uniformly scaled in the X, V and Z axes by a predetermined percentage such as, for example, positive 5% and negative 5%.

At a step 205, basic math functions such as calculation of area and volume of the object in the model file that was scaled at step 204 may be performed.

At a step 206, the object may be mirrored across the X axis.

At a step 207, the object may be mirrored across the Y axis.

At a step 208, the object may be mirrored across the Z axis.

At a step 209, flat plane object splitting (planar logic creation) may be performed on the object. The object (mirrored in all axes) can be sliced at every nth interval (programmable) by an infinite plane, and points may be created at the edge of plane object collision.

At a step 210, sloped plane object splitting (angled logic creation) may be performed on the object. The object (mirrored in all axes) can be sliced at every nth interval (programmable) by an infinite plane rotated in the X and Y axes by 45 degrees, and points may be created at the edge of plane object collision.

At a step 211, (infinite position logic) points from planar point creation may be given positive and negative values that relate to all possible X Y Z quadrant locations.

At a step 212, the entire data set of at least the positive and negative point values may be exported as comma-separated values that becomes the testing database for three-dimensional object recognition.

An embodiment includes a framework for machine learning to view an object from any location in digital space and calculate similarities using several calculation methods. The first, in an embodiment, is resizing the model by +±5%. This eliminates any model topological errors that occur when changing model platforms and modeling methods.

Another feature, that may be considered one function according to an embodiment, is mirror across all axis and slope point creation. With these functions, the data can be used to calculate all possible derivatives and face slope of an object in space. With derivative (slopes) calculated, regardless of object positioning or rotation in space, it is recognizable via machine learning.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A computer implementable method comprising the steps of:
   accessing a model file containing a digital 3-D object;
   calculating at least one dimensional measurement of the object;
   mirroring the object across the X, Y and Z axes;

slicing into slices the mirrored object at a predetermined interval by an infinite plane in both a rotated and unrotated state of the infinite plane;

generating, from the slices, points at an edge of a plane object collision;

assigning to the points positive and negative values relating to all possible X, Y and Z octant locations, exporting to a database the positive and negative values as comma-separated values; and recognizing, based on the comma-separated values in the database, one or more 3-D objects.

2. The method of claim 1, wherein the at least one dimensional measurement comprises at least one of an area calculation and a volume calculation.

3. The method of claim 1, further comprising moving the object to origin (0,0,0) in digital space.

4. The method of claim 1, wherein the predetermined percentage comprises at least one of positive 5% and negative 5%.

5. The method of claim 1, further comprising calculating at least one dimensional measurement of the object.

6. The method of claim 1, wherein the rotated state comprises rotation of the infinite plane in the X and Y axes by 45 degrees.

7. At least one non-transitory computer-readable medium on which are stored instructions that, when executed by at least one processing device, enable the processing device to perform a method comprising the steps of:

accessing a model file containing a digital 3-D object;

calculating at least one dimensional measurement of the object;

mirroring the object across the X, Y and Z axes;

slicing into slices the mirrored object at a predetermined interval by an infinite plane in both a rotated and unrotated state of the infinite plane;

generating, from the slices, points at an edge of a plane object collision;

assigning to the points positive and negative values relating to all possible X, Y and Z octant locations;

exporting to a database the positive and negative values as comma-separated values; and recognizing, based on the comma-separated values in the database, one or more 3-D objects.

8. The medium of claim 7, wherein the at least one dimensional measurement comprises at least one of an area calculation and a volume calculation.

9. The medium of claim 7, wherein the method further comprises moving the object to origin (0,0,0) in digital space.

10. The medium of claim 7, wherein the predetermined percentage comprises at least one of positive 5% and negative 5%.

11. The medium of claim 7, wherein the method further comprises calculating at least one dimensional measurement of the object.

12. The medium of claim 7, wherein the rotated state comprises rotation of the infinite plane in the X and Y axes by 45 degrees.

* * * * *